May 31, 1932. J. LOCKHART ET AL 1,860,679
CONVEYER
Filed Feb. 16, 1929  2 Sheets-Sheet 1
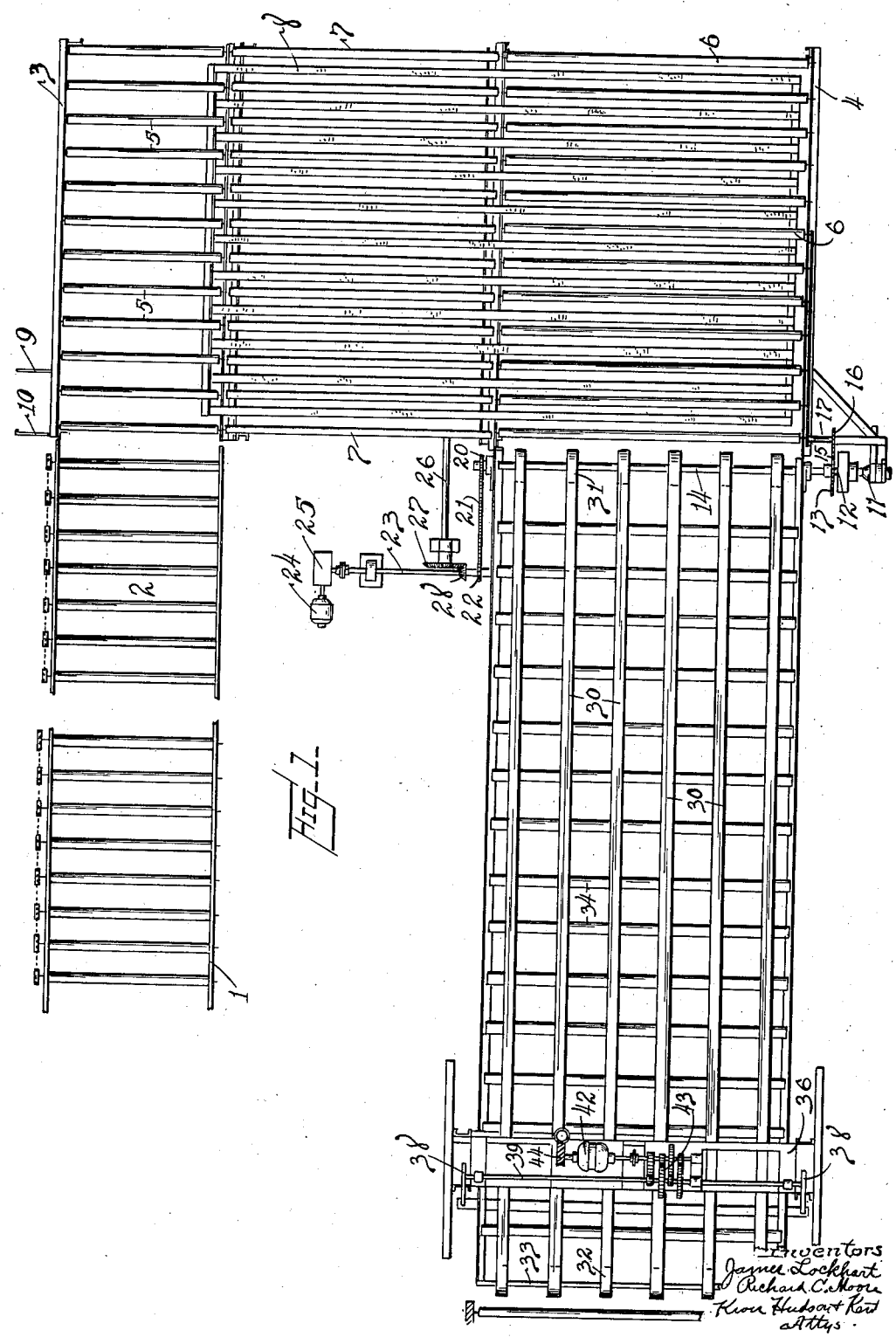

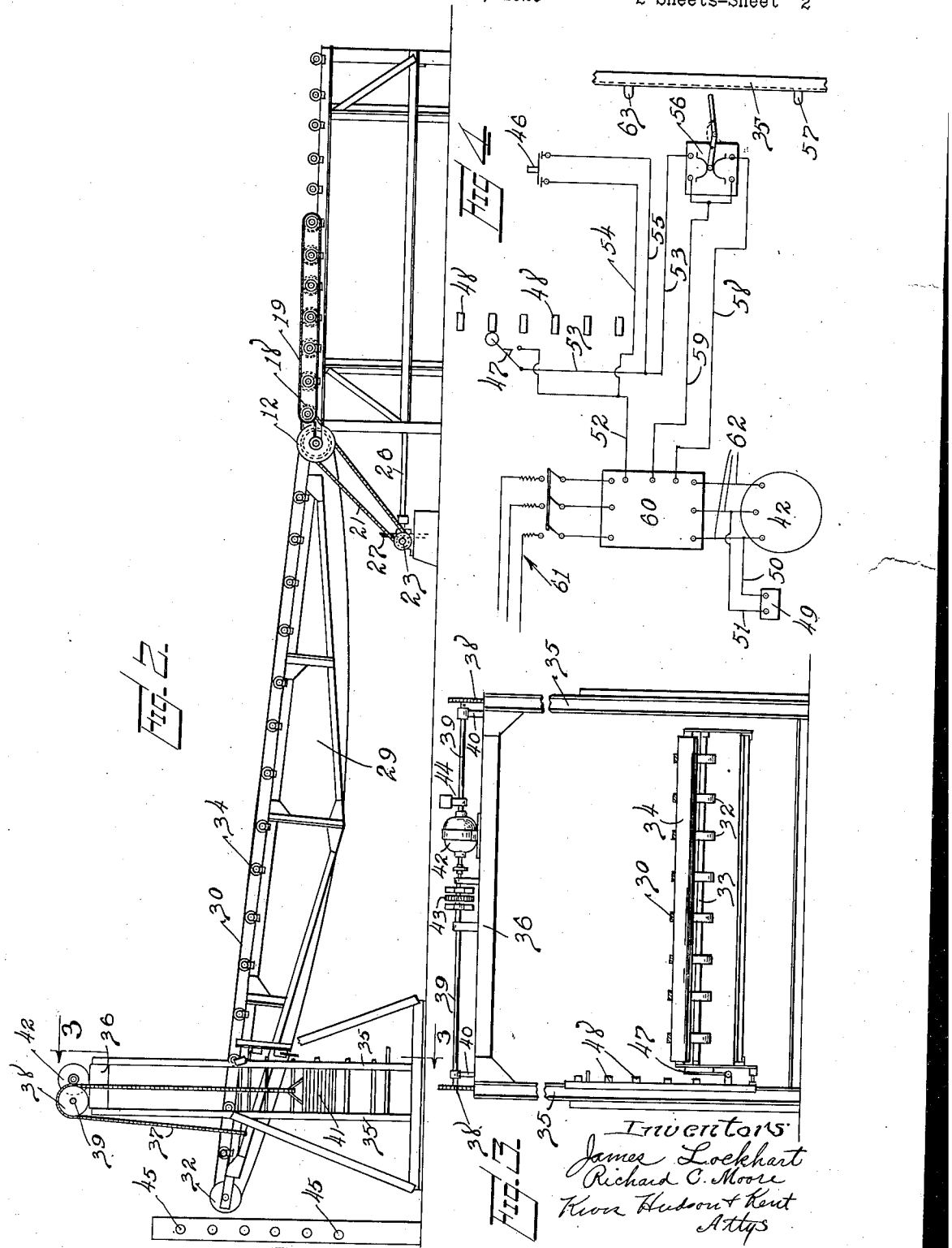

Patented May 31, 1932

1,860,679

UNITED STATES PATENT OFFICE

JAMES LOCKHART AND RICHARD C. MOORE, OF PAINESVILLE, OHIO, ASSIGNORS TO THE COE MANUFACTURING COMPANY, OF PAINESVILLE, OHIO, A CORPORATION OF OHIO

CONVEYER

Application filed February 16, 1929. Serial No. 340,359.

This invention relates to conveyers, and more particularly to a tipple conveyer for transferring articles, such as pieces of composition board, from one conveyer to one or more other conveyers arranged at different levels with respect to the first conveyer and each other.

An object of the invention is to provide means operated with a minimum amount of manual control, whereby articles, such as elongated pieces of composition board, may be transferred from one conveyer to one or more other conveyers arranged at different levels with respect to the first conveyer and each other.

A further object of the invention is to provide a conveyer which may be moved from a position in operative association with a second conveyer arranged at one level to a similar position with respect to another conveyer arranged at a different level and automatically stopped in such last named position.

A still further object is to provide a conveyer which may be successively moved from a position of operative association with one conveyer to a similar position with respect to one or more different conveyers arranged at different spaced levels, and which will automatically return to its position of operative association with the first conveyer after it has moved out of such position with respect to the last one of the conveyers.

A further object is to provide a conveyer of the type specified, which is simply and ruggedly constructed, has few parts, can be economically manufactured, and in which the expense of maintenance and operation is low.

With the above and other objects in view the invention may be said to comprise a machine, as illustrated in the accompanying drawings, hereinafter described, and particularly set forth in the appended claims, together with such variations and modifications thereof as will be apparent to one skilled in the art to which the invention appertains.

Reference should be had to the accompanying drawings forming a part of the specification, in which Figure 1 is a top plan view of a machine embodying the invention; one form of conveyer arrangement which may be employed to bring the articles to the tipple conveyer being shown.

Fig. 2 is a side elevation looking toward the bottom of Fig. 1.

Fig. 3 is a sectional view taken on line 3—3 of Fig. 2, looking in the direction of the arrows, and Fig. 4 is a diagrammatic view showing the circuit for the control mechanism.

In the accompanying drawings the invention is illustrated in connection with a machine designed to handle composition board or similar material, in which the pieces of material are delivered from a forming machine onto a conveyer extending alongside a drying oven and past the end thereof to a transfer device, from which they are transferred to a second conveyer parallel to the first and running in the opposite direction, such second conveyer delivering the pieces of material into a drying oven. It should be understood that the conveyer arrangement shown is only one of the many different arrangements which may be used to bring the pieces to the tipple conveyer, such arrangement being shown by way of illustration. The pieces in some arrangements would be brought to the tipple conveyer by conveyers arranged substantially in longitudinal alignment therewith, while in other arrangements the pieces might be manually or otherwise fed directly to the tipple conveyer.

A portion of the conveyer which receives the articles or pieces of material is indicated at 1 in Fig. 1, this conveyer being preferably a roller conveyer provided with continuously driven rollers. Adjacent the transfer table, which moves the pieces of material laterally, the conveyer 1 has a section 2, in which the rollers are driven at a higher rate of speed to provide an interval between the delivery of successive articles to the transfer device. The articles are delivered one at a time onto the transfer table 3, and from the transfer table 3 to a second transfer table 4, which is parallel with the first, but spaced laterally therefrom. Both transfer tables are supported upon a common supporting frame, which extends transversely therebetween, the transfer tables being arranged respectively upon the opposite ends of the frame. In front of the discharge end of the conveyer 1 a bed of idle rollers 5 is mounted upon the table 3 at the level of the rollers of the discharge section 2 of the conveyer 1. At the opposite end of the frame on the transfer table 4 there is mounted a bed of rollers 6, a portion of the rollers 6 being idle rollers, while others thereof are driven rollers. The individual rollers 5 of the roller bed on the transfer table 3 are in longitudinal alignment with the corresponding individual rollers 6 on the transfer table, and the space between the two roller beds is bridged by a series of bars 7 fixed to the frame and in longitudinal alignment with the rollers 5 and 6 of the two tables. The mounting arrangement of the rollers 5 and 6 and the intermediate bars 7 provides open spaces for the full length of the frame between successive rollers and bars and in these spaces there are mounted transfer bars 8 which are supported by a carriage mounted for longitudinal movement in the frame. The length of the transfer bars 8 is less than the length of the frame by an amount substantially equal to the length of the rollers 5, so that the bars may be reciprocated from a position in which one end thereof is substantially at the outer end of the rollers to a position in which such end is adjacent the inner end of the rollers 5.

The foregoing description covers a construction fully described in United States Patent No. 1,695,115, issued to James Lockhart December 11, 1928, and in which patent it is also described how operation of the lever 9 when the bars 8 are under rollers 5 raises such bars above the level of the rollers to pick up the pieces of material therefrom and also sets a clutch mechanism to operatively connect the carriage supporting the bars to a driving mechanism which moves such carriage toward the rollers 6 with the bars in the elevated position. The patent also fully describes the mechanism whereby the bars are automatically lowered when they have reached the limit of their movement toward the rollers 6, to deposit the pieces of material upon either the bars 7 or the rollers 6, and are then returned to a position beneath the rollers 5 where the carriage is automatically brought to rest.

It should be understood that the pieces of material are conveyed by the transfer bars 8 from the rollers 5 to the rollers 6 in a step by step movement, first being deposited on the bars 7 and then on the rollers 6. Further description of this construction is unnecessary in view of the description thereof contained in the above mentioned patent. It should be repeated that the transfer apparatus just described is only one of the many different devices or ways by which the sheets of material may be brought to the conveyer or tipple embodying the invention.

When it is desired to move the sheets of material which have been deposited on the rollers 6, the operator actuates the lever 10 arranged adjacent the lever 9 and connected by a link (not shown) running longitudinally of the transfer frame to a pivoted lever operatively connected with a clutch collar 11 of the clutch 12. This clutch operatively connects the sprocket 13 with the shaft 14, a chain 15 passing around said sprocket and a sprocket 16 arranged on a shaft 17. The shaft 17 is a prolongation of the shaft supporting the first roller 6 and is provided with a second sprocket 18 about which passes a chain 19. A portion of the rollers 6 are similarly provided with sprockets arranged on the end of their supporting shafts and the chain 19 passes around the sprockets and drives these rollers. The shaft 14 is provided on the far side from the clutch 12 with a sprocket 20 which is operatively connected by a chain 21 with a sprocket 22 driven by the shaft 23 in turn actuated by the motor 24 which drives the transfer mechanism. The motor 24 is connected to the shaft 23 through a gear reduction 25, while the power shaft 26 for the transfer mechanism is connected through a gear 27 and pinion 28 to the shaft 23. The actuation of the clutch 12 by the lever 10 will cause the sheets of material resting on the rollers 6 to be moved therefrom onto the conveying means embodying the invention and now about to be described.

The tipple conveyer comprises a trussed frame 29 pivoted at its end adjacent the rollers 6 upon a horizontal pivot and extending in longitudinal alignment with the series or bed of rollers 6. The conveying portion of the tipple consists of a series of parallel belts 30 which extend over pulleys 31 fixed to shaft 14 and over pulleys 32 fixed on a shaft 33 at the discharge end of the tipple. The belts 30 are supported intermediate the pulleys 31 and 32 by transverse idle rollers 34.

The tipple is supported from an overhead frame arranged adjacent the discharge end thereof, the supporting means being such that the tipple may be elevated or lowered about its pivot. This means, together with automatic means for stopping the movement of the tipple at certain predetermined desired points and for automatically returning the tipple to a position to start the cycle of operations upon the completion of a cycle will be more fully described hereinafter.

The supporting frame for the tipple includes vertical supporting members 35 arranged on each side of the tipple and connected at their upper ends by a supporting platform 36 extending therebetween transversely of the tipple. It is understood that the supporting frame is provided with suitable bracing and reinforcing members wherever such are necessary, these members not being specifically referred to herein.

Supporting and hoisting chains 37 are secured to each side of the tipple adjacent its discharge end and pass upwardly over sprockets 38 fixed to a transversely extending shaft 39 rotatably supported in bearing brackets 40 mounted on the platform 36. The chains 37 pass downwardly between the frame members 35 and have secured at their lower ends counterweights 41 which counterweights may be suitably guided by guide means secured to the frame members 35. A motor 42 arranged on the platform 36 drives the shaft 39 through a suitable gear reduction indicated generally at 43. The motor 42 is provided with a magnetic brake 44 of any conventional construction, the purpose of which will later become clear.

Since it is desired to discharge articles from the tipple conveyer successively onto different conveyers of a plurality of vertically spaced decks of conveyers 45, such as are used in certain types of driers, it is proposed to provide means for effecting the operation and stoppage of the motor 42 to automatically cause the tipple to come to rest in operative alignment with the successive decks of conveyers 45 and to also automatically return the tipple to the beginning of the cycle after the tipple has passed its position in alignment with the last or lower deck of the conveyers 45. To this end, the motor 42 is arranged in a control circuit which is clearly disclosed in the diagrammatic showing of Fig. 4.

Although the operation of the tipple conveyer may be commensed from any of its various positions of adjustment, the following description will start with the tipple arranged in operative alignment with the upper or top deck of the conveyers 45. The tipple conveyer being in this position, it is simply necessary for the operator to push the button switch 46 arranged in proximity to the levers 9 and 10, or in any other suitable and convenient place, whereupon the motor circuit will be closed and the motor started. This operation of the motor rotates the sprockets 38 in the proper direction to lower the discharge end of the tipple. The motor will continue to run until the normally closed switch 47 carried by the tipple engages with the next to the top of a series of vertically arranged stops 48 on the frame, whereupon the switch 47 is opened and the circuit to the motor broken. The stops are so arranged that the tipple may be brought to rest in the proper operative alignment with the next lower deck 45. In order to overcome the momentum of the tipple and the slight movement thereof which would thus be occasioned after the switch 47 is opened, the brake 44 is adapted to function as soon as the switch 47 has been opened by its engagement with the stop 48. When the motor is running, the brake 44 is held in inoperative position by a solenoid 49 connected to the motor circuit by leads 50 and 51, but as soon as the current is cut off from the motor the solenoid 49 is released and the brake is set by a spring, thus bringing the moving parts quickly to rest. All that the operator need do to move the tipple into operative alignment with the next lower deck is to press the push button 46, thus bridging the leads 52 and 53 of the motor circuit which are open because the switch 47 is opened, whereupon the motor circuit will be closed and the motor operated, such operation of the motor lowering the tipple until the switch 47 has passed out of engagement with the stop 48 so that the switch closes and the motor circuit is completed through the leads 52 and 53.

As clearly shown on the diagram, this bridging between the leads 52 and 53 is effected by leads 54 and 55 connected to the different contacts of the push button 46. The previous description of the manner in which the tipple is lowered from deck to deck need not be repeated for each successive deck since the operation is the same, it being sufficient to say that all that is necessary to move the tipple from one deck to the other and to bring the same to rest in the proper position is to press the push button 46. After a sheet of material has been placed on the bottom deck, the operator simply starts the tipple downwardly in the usual manner by pressing the push button 46. However, a reversing switch 56 carried by the tipple contacts with the bottom limit stop 57 carried by the supporting frame and the switch is operated to reverse the motor. The leads 52 and 53 together with the lead 59 form the motor circuit through the switch 56 when the motor is operating in one direction while the lead 58 connected to the switch 56 and the common lead 59 form the motor circuit when the motor is operating in the reverse direction. All of these leads are connected through a suitable automatic reversing switch indicated in Fig. 4 at 60, which in turn is connected to the power circuit indicated generally at 61 and to the leads indicated by the numeral 62 leading directly from the switch 60 to the motor 42. The operation of the motor being reversed by the operation of the reversing switch 56 with the lower limit stop 57, the tipple is moved upwardly until the reversing switch 56 engages the top limit stop 63, such engagement again effecting reversal of motor operation and taking place after the stop switch 47 has passed beyond the stop 48 for the upper deck 45.

From the wiring diagram, it is obvious that there will be no interruption of the upward movement of the tipple because of the engagement of the stop switch 47 with the stops 48, since the motor is operated on a different circuit for effecting this movement than it is when effecting the downward movement of the tipple. The motor having been reversed by the engagement of the reversing switch 56 with the top limit stop 63, the tipple will commence its downward movement until the stop switch 47 engages with the stop 48 for the first deck 45, whereupon the tipple will come to rest in the proper operative alignment with the first deck 45.

It is thus apparent that an operator from a single station may readily transfer the articles or sheets of material from the table 4, or any other arrangement for bringing the material to the tipple, to the desired deck of conveyers 45 with a minimum amount of manual control. In the arrangement shown it is simply necessary for him to press momentarily the button 46 to move the tipple into operative alignment with the next empty deck of conveyers 45 and then actuate the lever 10 to throw in the clutch 12 and start the rotation of the rollers 6, thus removing the sheet or sheets of material thereupon onto the conveyer belts 30 of the tipple. The operation of the tipple being substantially automatic practically eliminates faulty operation, reduces the time and expense of operation, and consequently the cost of production. The parts involved in the construction and operating arrangement of the tipple are simple and for the most part of standard construction, thus avoiding the necessity of specially constructed switches and complicated wiring.

Although a preferred embodiment of the invention has been shown and described herein, it should be understood that the invention is susceptible of various modifications and adaptations within the scope of the appended claims.

Having thus described our invention, we claim:

1. In a device of the character described, a conveyer pivoted adjacent one end and adjustably supported adjacent the other end, a motor for raising and lowering the adjustable end of the conveyer, manually controlled means for starting the operation of the motor, automatic means for stopping the operation of the motor and the movement of the conveyer at a plurality of points in one direction, and automatic means for reversing the operation of the motor at the limit of movement of the conveyer in either direction.

2. In a device of the character described, a conveyer member pivoted adjacent one end and adjustably supported adjacent the other end from a frame member, a motor for raising and lowering the adjustable end of the conveyer member, a plurality of stops arranged on one of said members, and a plurality of switches arranged on the other of said members, one of said switches coacting with certain of said stops to automatically render the motor inoperative at predetermined points in the movement of the conveyor and another of said switches coacting with other of said stops to automatically reverse the operation of the motor at predetermined points in the movement of the conveyer.

3. In a device of the character described, a conveyer member pivoted adjacent one end and adjustably supported adjacent the other end from a frame member, a motor for raising and lowering the adjustable end of the conveyer member, and operative connections between said motor and said end of said member, a plurality of stops arranged on said frame member, a switch carried by said conveyor member and opened by engagement with said stops, said switch being arranged in the circuit for operating said motor in one direction, a pair of stops on said frame member and spaced apart a greater distance than the end stops of said first mentioned stops, and a second switch carried by said conveyer member and co-acting with said pair of stops to automatically reverse the operation of the motor and the movement of the conveyer.

4. In a device of the character described, a pivoted conveyer member one end of which is movable between portions of a frame member, means connected to said end for supporting and raising and lowering the conveyer, a motor for operating said means in opposite directions and connected to a source of power by a different circuit for each direction of its operation, a normally closed switch on one of said members and arranged in one of said circuits, a plurality of stops on the other of said members and engageable with said switch to open the same, a normally open manually operated switch arranged when closed to bridge the circuit through said first named switch, a third switch on one of said members adapted to selectively close either of said circuits, and stops on the other of said members arranged to engage said last mentioned switch to automatically operate the same during the movement of said conveyer member.

In testimony whereof, we hereunto affix our signatures.

JAMES LOCKHART.
RICHARD C. MOORE.